United States Patent [19]

Lotz, deceased et al.

[11] Patent Number: 4,856,735
[45] Date of Patent: Aug. 15, 1989

[54] WING SECTIONS, IN PARTICULAR LIFT-WING SECTIONS FOR AIRCRAFT

[75] Inventors: Michael Lotz, deceased, late of Immenstaad, by Carla Lotz née Post, heir and Andreas Lotz, heir; Rüdiger Vanino, deceased, late of Hagnau, H. L. I. M. Vanino, heir; Peter Kühl, Immenstaad; Dieter Welte, Markdorf; Herbert Zimmer, Friedrichshafen, all of Fed. Rep. of Germany

[73] Assignee: Dornier GmbH, Friedrichahfen, Fed. Rep. of Germany

[21] Appl. No.: 433,890

[22] Filed: Oct. 12, 1982
(Under 37 CFR 1.47)

[30] Foreign Application Priority Data

Oct. 10, 1981 [DE] Fed. Rep. of Germany ....... 3140350

[51] Int. Cl.[4] .................................................. B64C 3/14
[52] U.S. Cl. .................................................. 244/35 R
[58] Field of Search ............. 244/213, 215, 216, 35 R, 244/35 A, 204, 212

[56] References Cited

U.S. PATENT DOCUMENTS

| 2,908,454 | 10/1959 | De Wolff . | |
| 4,015,787 | 4/1977 | Maieli et al. | 244/215 |
| 4,413,796 | 11/1983 | Bousquet | 244/35 R |
| 4,455,003 | 6/1984 | Hilbig | 244/35 R |

FOREIGN PATENT DOCUMENTS

0068121 1/1983 European Pat. Off. .......... 244/35 R

Primary Examiner—Galen Barefoot
Attorney, Agent, or Firm—Ralf H. Siegemund

[57] ABSTRACT

Wing sections, in particular aircraft lift-wing sections, with a section contour where the curvatures in the supersonic flow areas at the top and bottom sides of the section vary as little as possible and where each area is followed by a recompression region with a pronouced maximum of curvature and with tightly spaced inflection points therebehind, a flow gap being selectively settable and located behind the recompression area of the top side of the section.

5 Claims, 10 Drawing Sheets

WING SECTIONS, IN PARTICULAR LIFT-WING SECTIONS FOR AIRCRAFT

This invention relates to wing sections, in particular aircraft lift-wing sections, provided with means to form a gap, based on a design Mach number between 0.2 and 0.9 and with an effective lift coefficient between −0.1 and 1.5 in the high speed range and with a lift coefficient of up to 2.5 in the low-speed range.

In supercritical lift-wing sections supersonic flow already exists on part of the contour thereof, while the incident flow itself is at subsonic speed.

Where it is possible to delay the supersonic speed with low losses, that is, with a weak shock or in specific cases also shock-free, to subsonic speed at the rear section by providing the section with a special shape, then such a design will offer an advantage over the heretofore conventional wing sections. This advantage can be so exploited that at a given Mach number a supercritical section can be thicker than conventionally, resulting in a decreased structural weight or in a larger useful volume of fuel, or, with the wing thickness kept constant, a higher flight Mach number can be achieved. In both instances, a significant increase in flight performance is made possible.

While in the early years of transsonic aerodynamics the lift-wing sections were developed empirically, theoretical computational procedures have become available in recent years by means of which supercritical lift-wing sections can be projected with high accuracy for a given operational point and can be checked computationally in the range of the angle of incidence and Mach number of interest.

Such supercritical lift-wing sections already have become known in several designs. Corresponding to the various shapes, different types of pressure distributions form at the model point of the known supercritical lift-wing sections, both on the top and the bottom sides of the sections. Substantially three developmental approaches can be distinguished, namely the pressure distribution of the supersonic field of the top side of the wing section—which extends over a fairly large range of section depth—is approximately constant (roof-top sections) on one hand, on the other, this pressure distribution also can drop about linearly from a fairly high suction peak in the nose range (the peak sections), and lastly it is attempted to combine the advantages of both section contour types into a single one.

The first development approach is known from German Offenlegungsschrift No. 2,254,888. The supersonic field of the top side of the wing section is terminated in this case by a compression shock which is designed to be quite weak and can be located relatively far to the rear. This approach however has the drawback that the nose-heavy pitching moment is fairly high and that when exceeding the design Mach number, the limit on the rise in drag is quickly reached. Due to the shock location being far to the rear and the steep pressure gradients required thereby, there is a high load on the rear segment of the wing section and the detachment limit of a boundary layer is soon reached. Because this type of wing section evinces a relatively large nose radius, the behavior in the low-speed range is favorable, with the tendency of flow-detachment from the nose of the wing section being reduced.

The second development approach is disclosed for instance in German Offenlegungsschrift No. 2,608,414, or German Offenlegungsschrift No. 2,626,276. The supersonic field is terminated with a fairly high suction peak in the nose range without a shock by isentropic recompression. As a consequence, this type of wing section results in low drag at the design point and a relatively long way to the limit of the rise in drag. However, this approach has the drawback that a decreased lift coefficient is achieved at the design point than in the first-cited section design, and in that as the flight Mach number increases, and/or as the angle of attack increases, a compression shock increasing in intensity toward the end of the supersonic area is created at once, whereby a non-linear pitch moment behavior may be incurred. These wing sections must evince a relatively thick nose region to generate the suction peak of the supersonic area. This suction peak is correspondingly reinforced in the low-speed range, whereby the high-lift behavior of these sections is adversely affected by premature nose detachment.

As shown by German Offenlegungsschrift No. 2,712,717, the third development approach attempts combining the favorable properties of the above-cited types of wing sections while avoiding the stated drawbacks. The object is to realise the property of the high lift-coefficient of the roof-top sections with the advantageous drag behavior of the peak sections in one wing section. Advantageous aerodynamic properties are achieved within a given range about the design point.

The lift limit curves are highly significant in developing and analyzing supercritical lift wing sections. In particular for less than a Mach number of about 0.7, the limit curve of the maximum lift and forming the limit of the available lift of the section is significant. This limit curve is determined by the detachment of the flow about the section. Beyond the Mach number 0.7, the limit of the maximum lift passes into the buffeting limit. This is the lift limit in the transsonic range, a shock-induced and generally unstable boundary limit detachment taking place in the rear part of the section. The drag in this case already is so high that, as a rule, stationary flight at this limit no longer is possible. However, the aerodynamic properties of the wing section should be benign at the buffeting limit because this limit always can be reached in non-stationary flight motions.

Moreover, the limit of the rise in drag is especially significant. Below this limit there already may well be a supersonic area, but the recompression takes place with so few losses that as yet no rise in drag takes place. If on the other hand the angle of attack, or the lift or the incident flow Mach number is increased to such an extent that due to the increase in shock intensity the pressure drag already rises with respect to the reference value by a small, defined amount, then this limit curve is reached. It is highly significant to the stationary flight and the position of the limit curve is an important measure of the flight performance of an aircraft. Accordingly, the attempt is made when developing wing sections to achieve a limit in the drag rise which is associated with the highest possible lift coefficient for a given Mach number.

Where an aircraft is desired to possess good flight performance both for very low lift (range A in FIG. 1) and also as high as possible a lift (range B, FIG. 1), and additionally a high buffeting limit with a benign flight behavior, then the supercritical and conventional wing sections used to date are unsuitable because the possible lift thereof is inadequate in the conventional sections and as regards the known supercritical ones, the nose-heavy pitching moment is excessive. Moreover the bottom side thereof is unsuited for a supercritical flow past it, and again the useful lift thereof at the buffeting limit is too low.

Contrary to the known section designs it is the object of the present invention to provide a wing section, which while being a supercritical section of the second generation, has as high as possible a Mach number for the rise in drag at a low lift coefficient, for instance as in conventional sections, and as high as possible a lift at a high Mach number, for instance as for the known supercritical sections, and with the highest possible lift at the buffeting limit with a benign flight behavior. Moreover, this wing section evinces a reduction of the nose-heavy pitching moment so as to reduce the trimming losses and a nose-range design by means of which an advantageous high lift behavior can be achieved even in the low speed area.

This problem is solved by the invention in that:
(a) the change in curvature is small at the top and bottom sides of the lift-wing section in that area along which the flow can become supersonic,
(b) this area is joined by a recompression region with a pronounced maximum of curvature both at the top and bottom sides of the wing section, with two points of inflection therebehind at a slight mutual spacing, and
(c) a flow gap can be selectively set in such a manner that the gap is located behind the recompression region of the top side of the wing section.

In the design of the wing sections of the invention, wherein the bottom and top sides are designed by the same criteria determined by the top side, the wing sections evince the same contour features at the top and the bottom sides in the decisive recompression area, i.e., in the area where supersonic flow is slowed down to subsonic flow, namely they evince a pronounced maximum of curvature with two consecutive, tightly spaced points of inflection. In this manner the shock intensity is reduced and the location of the shock is stabilized. The part of the section contours along which a supersonic area may occur is distinguished by a relatively low curvature as known from the top side design of the supercritical sections of the first generation.

The requirement for a useful lift as high as possible at the buffeting limit with benign flight behavior is met by the selective formation of a gap system, the gap being located behind the recompression region of the top side and the recompression region being determined by the maximum of curvature and the two points of inflection. The gap flow reduces the area of detached flow behind the fork shock and the top side flow of the flap is extensively forced to make contact again. In this manner, a significant increase in the useful lift is achieved while reducing buffeting and improving the flight behavior.

The requirement for a lesser nose-heavy pitching moment is met by load-relieving the rear section are and by loading the front segment more. To that end, the curvature is reduced at the rear and so modified at the front that the bottom side curvature is less than that of the top side.

The requirement for a high maximum lift in the low-speed range is met by the curvature function at the top and bottom sides of the wing section, resulting in an advantageous nose camber.

The invention will be further illustrated by reference to the accompanying drawings, in which.

Figure 1:
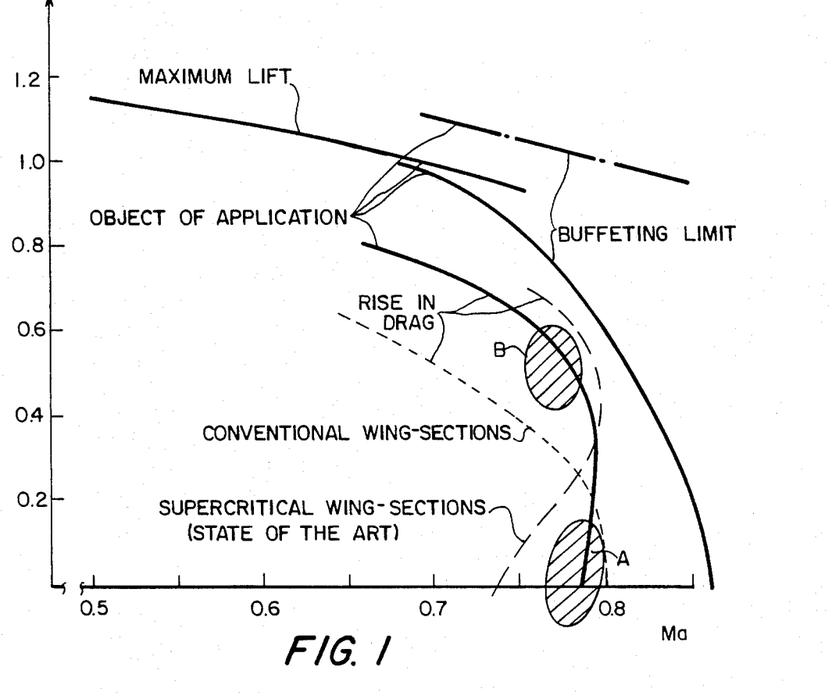
FIG. 1 is a graph showing the characteristics of lift with respect to the Mach number in comparison with known wing section designs.

FIG. 1 shows the difference between the buffeting limit of the previously known supercritical lift-wing sections of the first generation and the conventional sections. For instance, this Figure shows that conventional sections (the thin, dashed line) can reach a fairly high Mach number at low lift coefficients near zero (range A), until the limit of the drag increase is reached. However, as the lift increases, this limit then drops toward lower Mach numbers, whereby it is impossible to reach the range B by means of conventional sections. On the other hand, this is made possible using the heretofore known supercritical wing sections. As shown by the limit curve of the drag increase of these sections (thick, dashed line in FIG. 1), these sections well cover the range B.

At small lift coefficients, however, this limit bends off toward lower Mach numbers and there the known supercritical sections of the first generation are more disadvantageous than conventional sections, so that the range A cannot be reached therewith.

This behavior is evinced for instance by the known wing sections initially described. As a result, only the top side of the section is taken into account with respect to supercritical pressure distribution in the planning stage, and the bottom side of the section is so designed that as high as possible a lift will be obtained at sub-critical flow.

In turn this is possible only by very highly loading the rear section area (rear loading). The known supercritical sections of the first generation thus do evince a high limit for the rise in drag, which must be traded off on the other hand for a high nose-heavy pitching moment due to the rear-loading effect. Aircraft equipped with such wing sections on one hand cannot make full use of the wing section lift as far as the limit curve because the nose-heavy pitching moment causes trimming losses, and on the other hand these sections are designed to be operational only in the range of FIG. 1. For small lift coefficients the flight performance of these aircraft in fact would be less than if equipped with conventional sections.

Figure 1A:
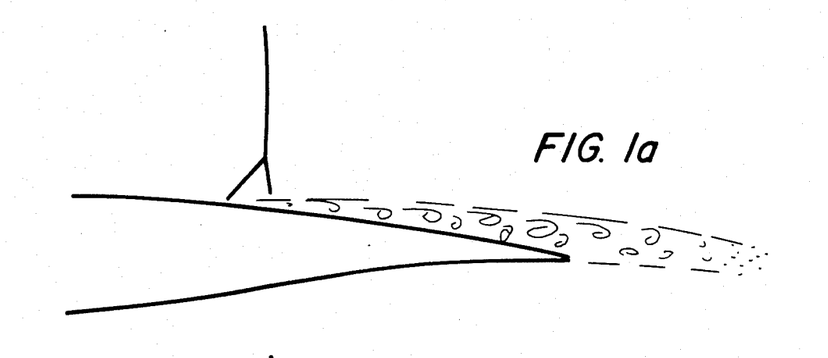
FIGS. 1a and 1b are the flow conditions at a wing section of the invention for the buffeting limit with and without a flow gap.

As shown by FIG. 1, the buffeting limit (solid line) is reached by the heretofore known supercritical sections relatively shortly after the limit of the drag increase. As already briefly mentioned, the flow field in the rear wing section is essentially as shown in FIG. 1a. The supersonic field is terminated by a compression shock which soon merges across the section surface as a rule into a fork shock. However, this shock already is so intense and hence the jump in pressure is already so high that the boundary layer therebehind is made to detach. As further shown by FIG. 1, the buffeting limit (solid line) of the known sections drops rapidly as the Mach number rises, whereby the useful lift rapidly drops to zero. However, aircraft when undergoing non-stationary flight motions can easily reach the buffeting limit, and even then as high as possible a lift should be achieved therefore, the known supercritical wing sections of the first generation cannot be used in this case.

Figure 1B:
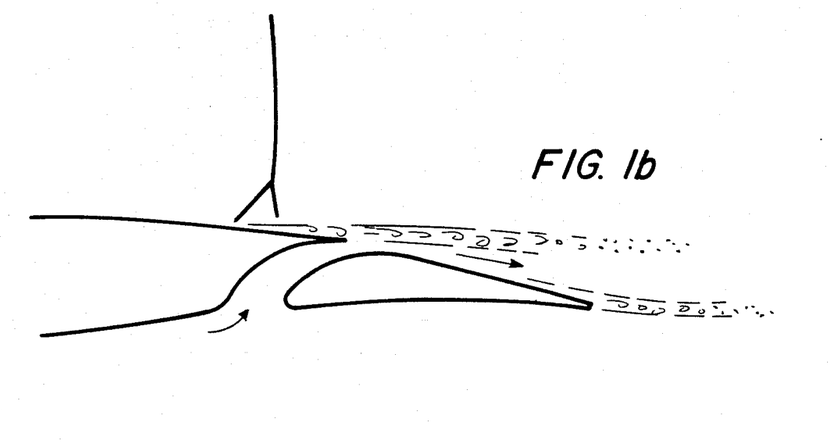

The shock-induced detachment of the boundary layer flow of FIG. 1a accordingly would be related to intense buffeting and the requirement for benign flight behavior cannot be met. FIG. 1b shows a section design with the selective setting of a flow gap. As already described, the requirement of as high as possible a useful lift at the buffeting limit with benign flight behavior is met by the possibility of a selective gap formation. In FIG. 1b, the gap is positioned behind the recompression region of the top side of the wing section, this region being bounded by the maximum of curvature and the two inflection points. The gap can be formed both by an adjustable covering to seal and clear the gap and by a correspondingly adjustable high lift flap.

Figure 2:
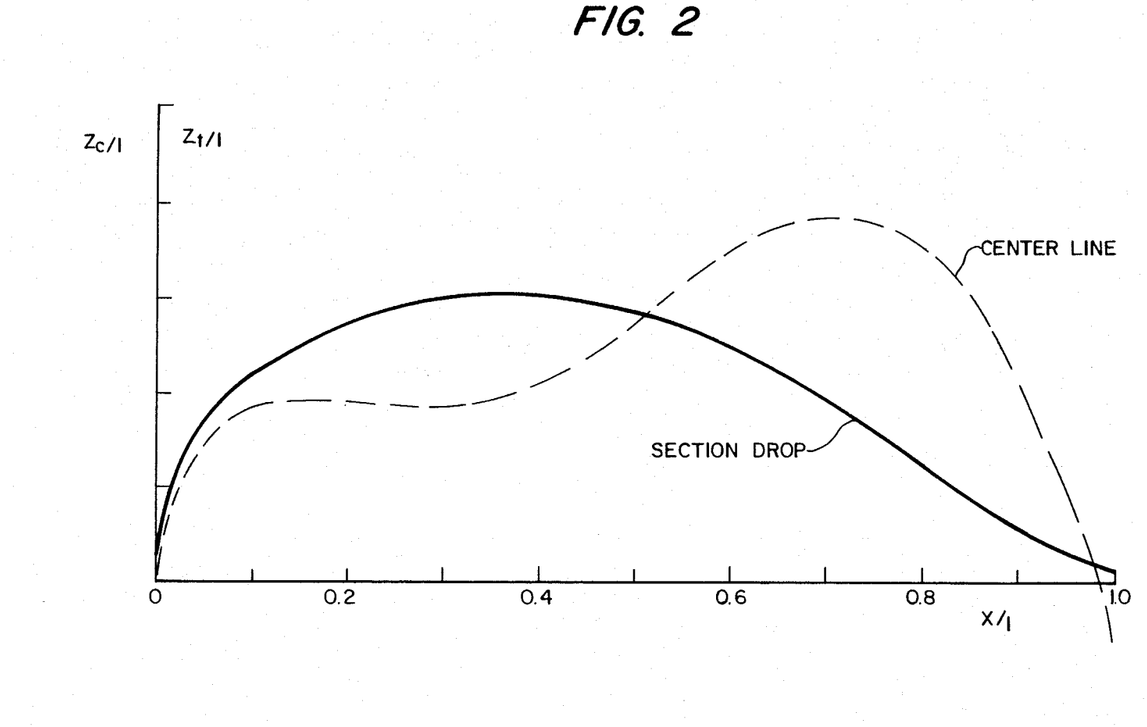
FIG. 2 is a graph of the characteristic section thickness (section drop), and of the section camber (center line)

FIG. 2 shows the section drop and the center line. The wing section drop is positioned further to the rear with its maximum thickness than it is, for instance, in German Offenlegungsschrift No. 2,712,717. As a result, a more advantageous drag behavior is obtained at high Mach numbers and about zero lift, and furthermore it is possible to mount the trailing edge flaps in a more favorable manner as regards weight (see FIG. 1b) because a greater installation height is available. Compared to the above, known sections, the center line evinces a more pronounced nose camber and a lesser trailing edge camber.

Figure 3:
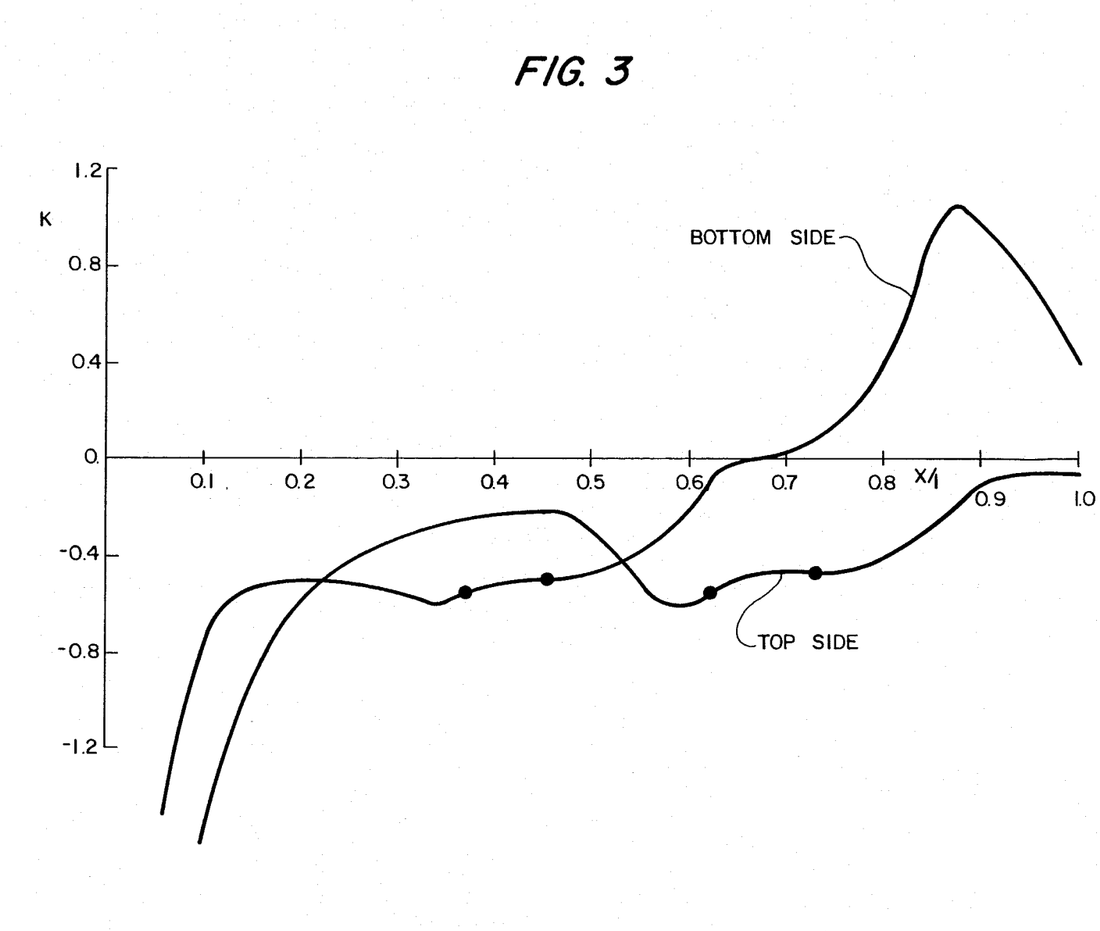
FIG. 3 shows the contour curvatures of the top and bottom sides of the wing section.

FIG. 3 shows the curvatures of the top and bottom sides of the wing section. The recompression areas are clearly in evidence, also being the same in their characteristics at the top and the bottom sides of the section, namely a pronounced maximum of curvature and two tightly spaced inflection points. This maximum is 0.6 at a section depth of 34 percent on the bottom side, and again it is 0.6 at the top side at a section depth of 59 percent. The first inflection point at the top and bottom sides is from 2 to 5 percent away in terms of wing depth, and the second inflection point is from 10 to 16 percent of the wing depth away.

The curvature changes little in front of this maximum, so that at the bottom side the curvature is between $-0.5$ and $-0.6$ in the range from 12.5 to 34 percent of the wing depth, and at the top side it is between $-0.2$ and $-0.4$ in the range from 26 to 53 percent of the wing depth.

The two curvatures intersect at 22 percent of the section depth, so that up to that point the curvature of the nose underside is less than that of the nose top side. This design, together with the second maximum of curvature of only 1.05 on the bottom side at 87.5 percent of the wing depth assures a substantial reduction of the nose-heavy pitching moment compared to the known supercritical lift-wing sections of the first generation.

The curvature in the nose range as shown in FIG. 3 together with the nose camber of FIG. 2 represents an advantageous nose section for high lift behavior.

Figure 4:
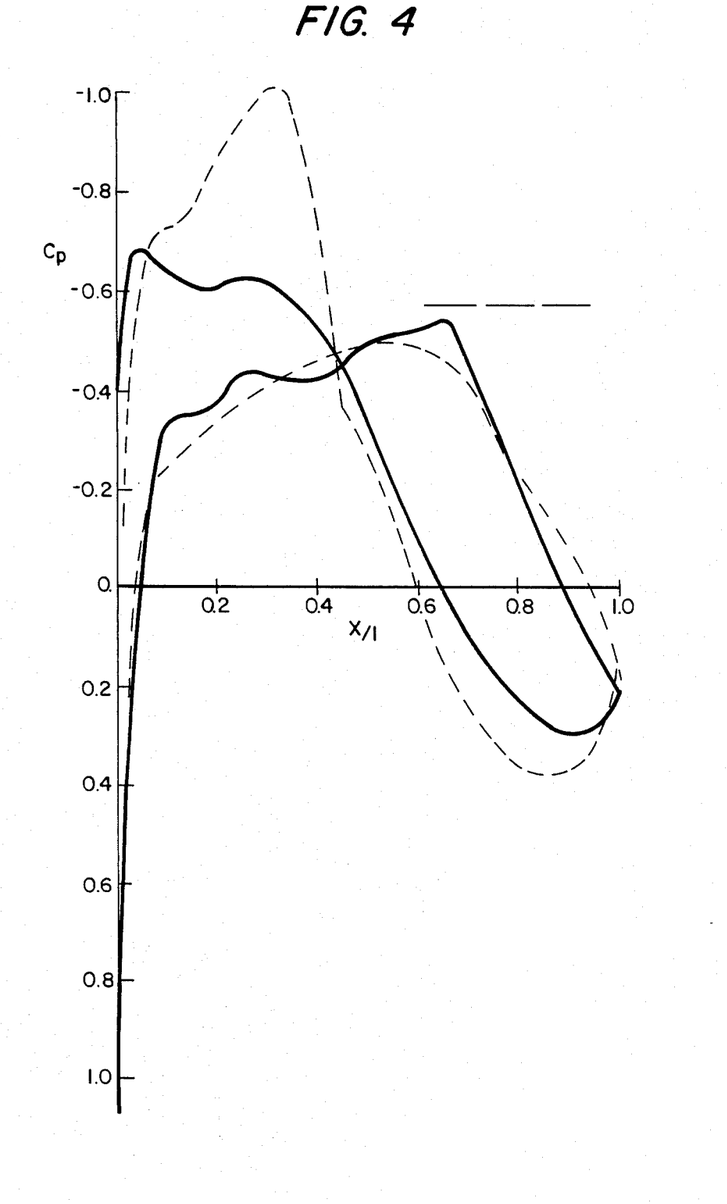
FIGS. 4 through 6 show the pressure distributions at the top and bottom sides of the wing section of the present design (solid lines) compared with known wing sections (dashed lines) with increasing Mach number and for lift near zero.
Figure 5:
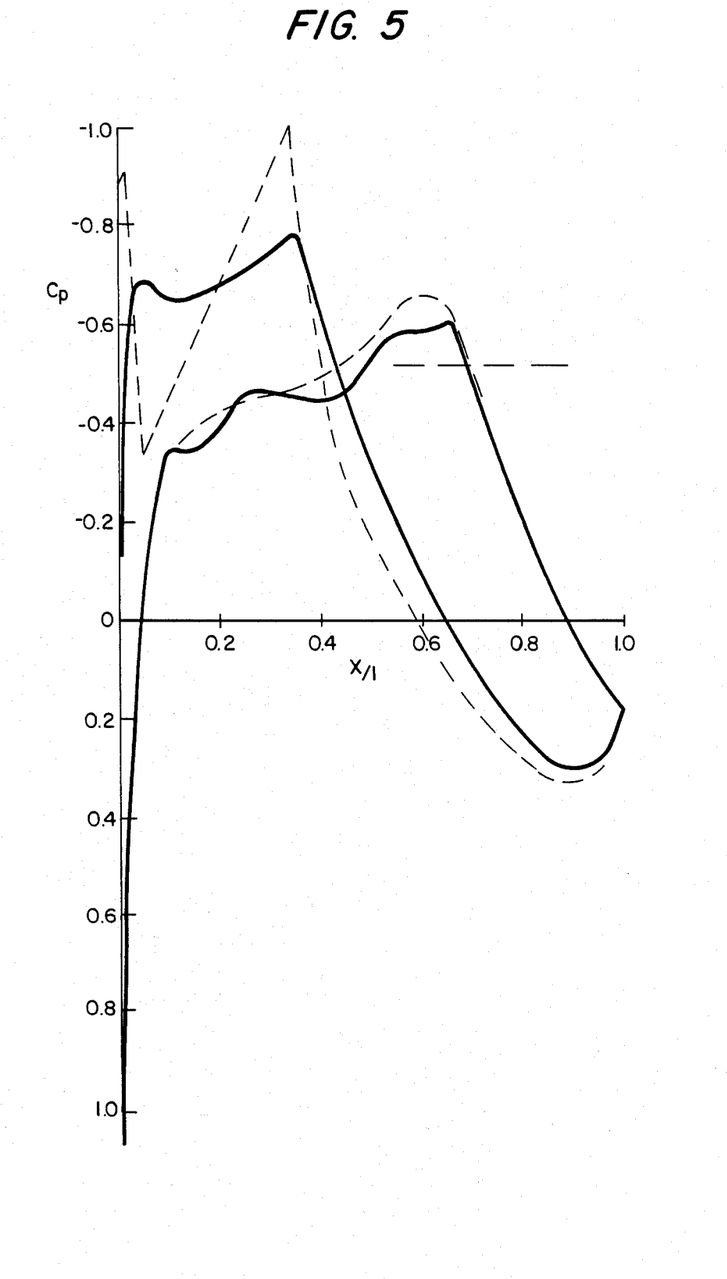
Figure 6:
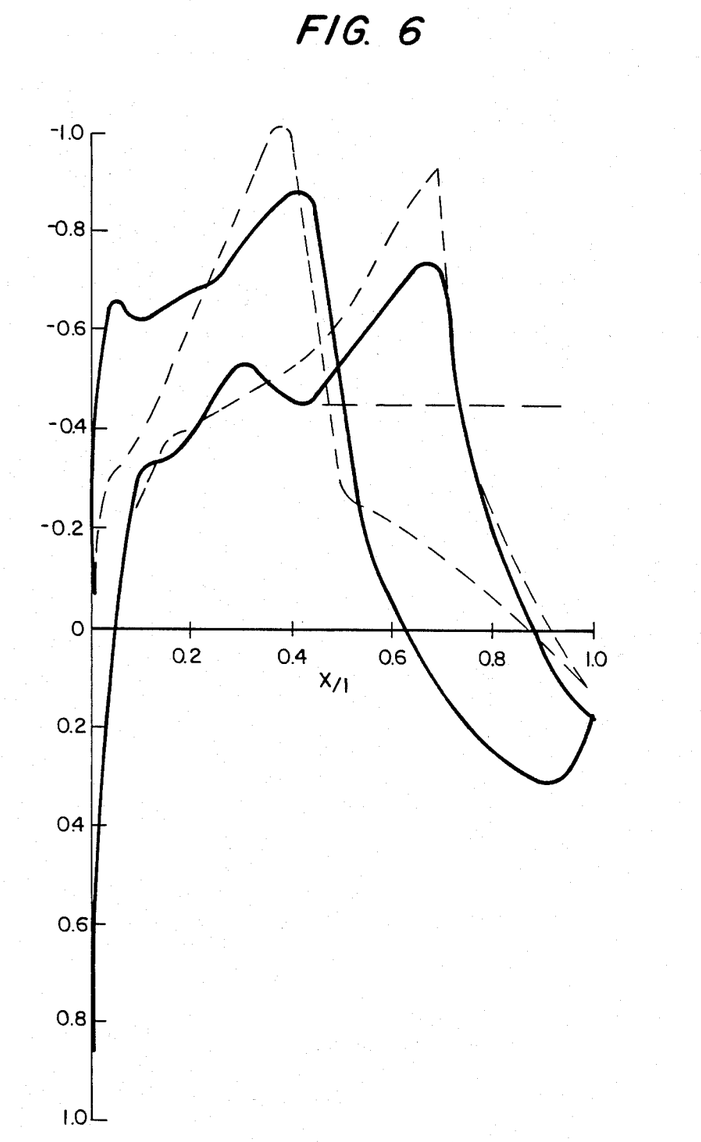

FIGS. 4 through 6 show a series of Mach numbers at near zero lift for the present wing section (solid line) compared with known sections (dashed lines). These pressure distributions represent approximately the range A of FIG. 1.

FIG. 4 relates to a Mach number somewhat less than the design Mach number (0.76). Whereas the present section still is free of shocks, a very intense shock is already present on the bottom side in the comparison section. A pressure distribution of this type is the reason that the range A cannot be reached by known supercritical wing sections.

FIG. 5 shows the conditions for a Mach number above the design value of 0.78. A compression shock has formed at the bottom side. However, this shock is small compared to that of the comparison section because the pressure jump is only about half.

At the highest Mach number (0.8) of FIG. 6, the shock is correspondingly more intense, however the flow behind it is still making normal contact, whereas the shock of the comparison section is so intense that the flow is completely detached from the rear half of the section.

Figure 7:
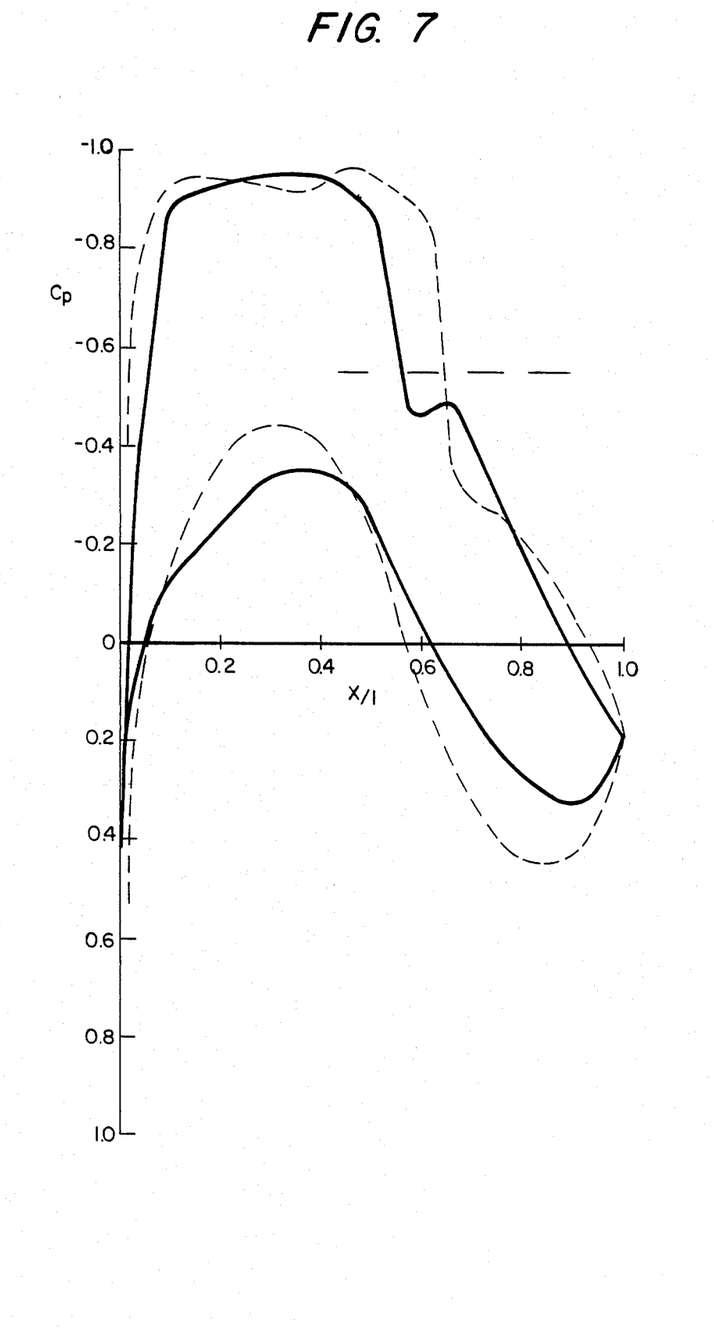
FIG. 7 shows pressure distributions at the top and bottom sides of the wing section at high Mach numbers and high lift compared with a known wing section (dashed lines)
Figure 8:
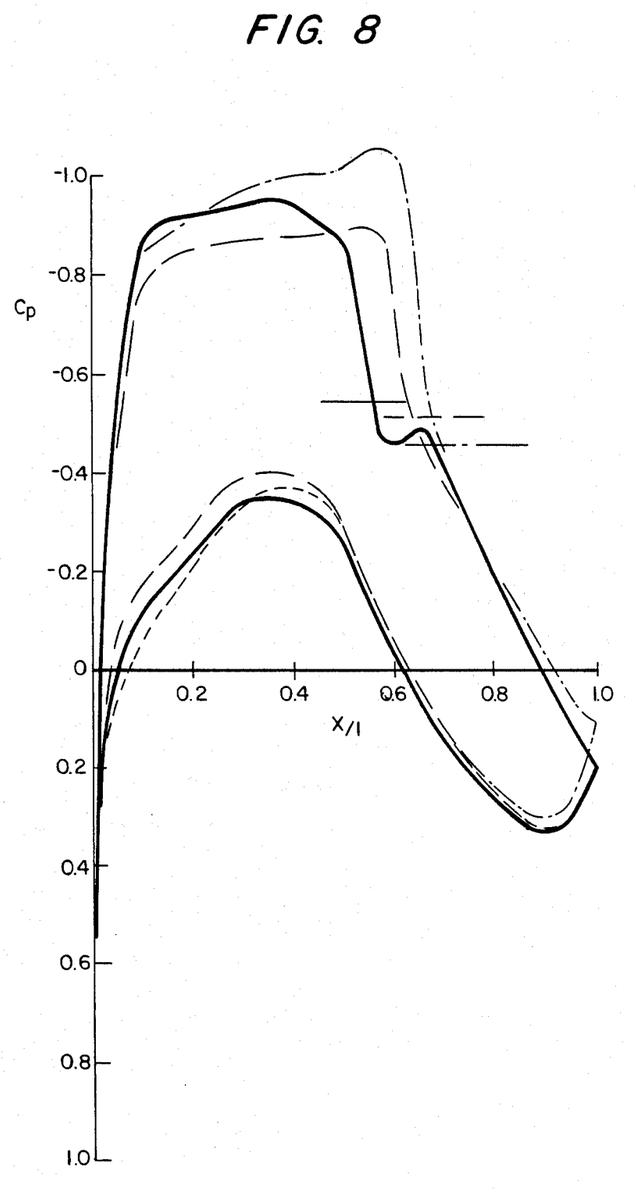
FIG. 8 shows pressure distributions of the present wing section design at high lift and increasing Mach number.

FIGS. 7 and 8 show several illustrative pressure distributions from the range B of FIG. 1, namely FIG. 7 shows a typical pressure distribution near the design points for known supercritical sections (solid lines) and a comparison section (dashed lines). The differences contributing to reducing the nose-heavy pitching moment are shown particularly clearly, namely the design of the bottom side, whereby the rear area is load-relieved and the front area is loaded more heavily. These steps reduce the nose-heavy pitching moment by about 30 percent.

FIG. 8 shows several examples from the range B of FIG. 1 as the Mach number rises (M=0.77, solid line; 0.78, dashed line; 0.80 dash-dot line). The shock migrates only slightly. This applies both to the top side of FIG. 8 and to the bottom side of FIGS. 4 through 6.

Figure 9:
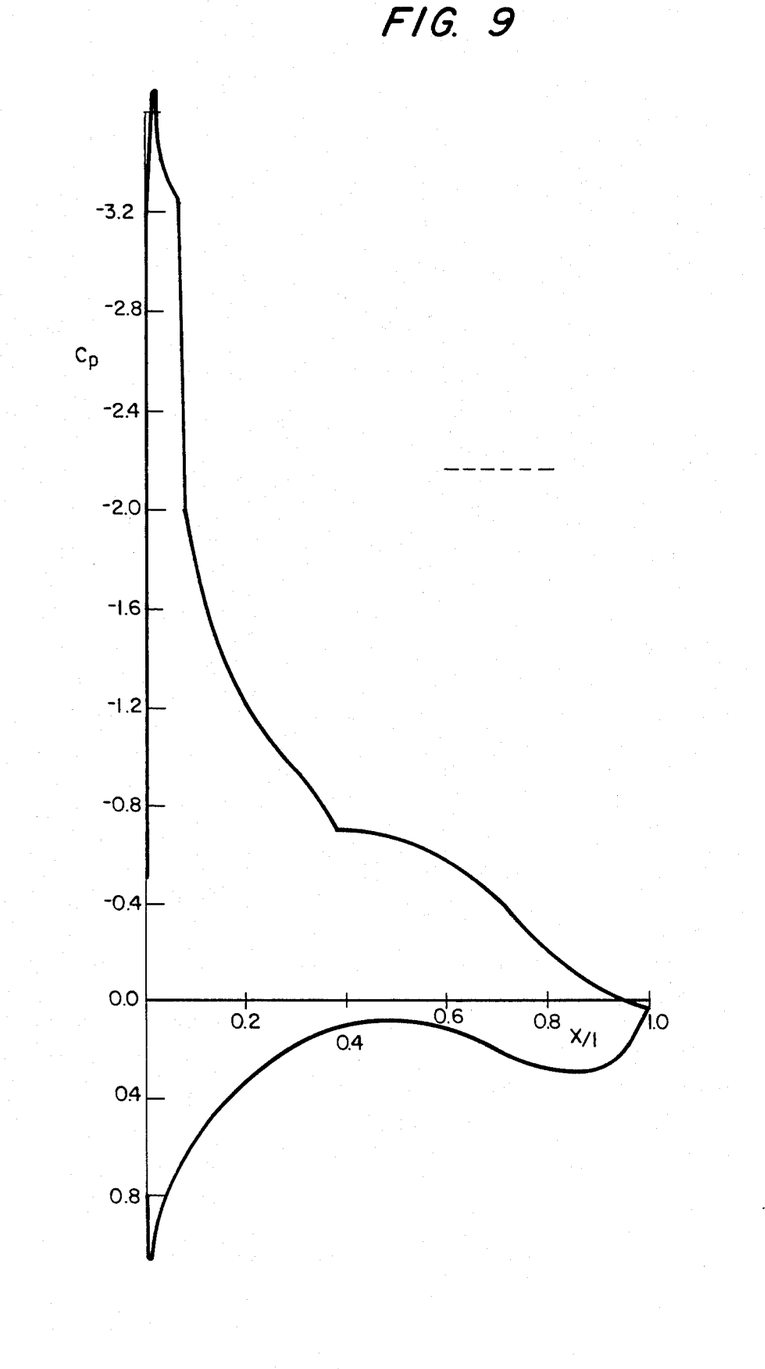
FIG. 9 shows the pressure distribution of the wing section design near maximum lift for a Mach number $M=0.5$.

The intersection of the curvatures in the fore area of FIG. 3 makes possible an advantageous nose shape which favorably affects the high-lift behavior in the low-speed range. FIG. 9 illustratively shows a pressure distribution at maximum lift. The lift coefficient (somewhat above 1.1) still achievable at this Mach number (0.5) is rather high (without a gap system).

An appreciable increase of the usable lift at the buffeting limit with reduced buffeting and improved flight behavior is achieved by the selectively adjustable gap system of FIG. 1b. Depending on the gap system, i.e., on the position of the gap flap of FIG. 1b, significantly still higher values can be obtained, indicated by the dash-dot line in FIG. 1.

Figure 10:
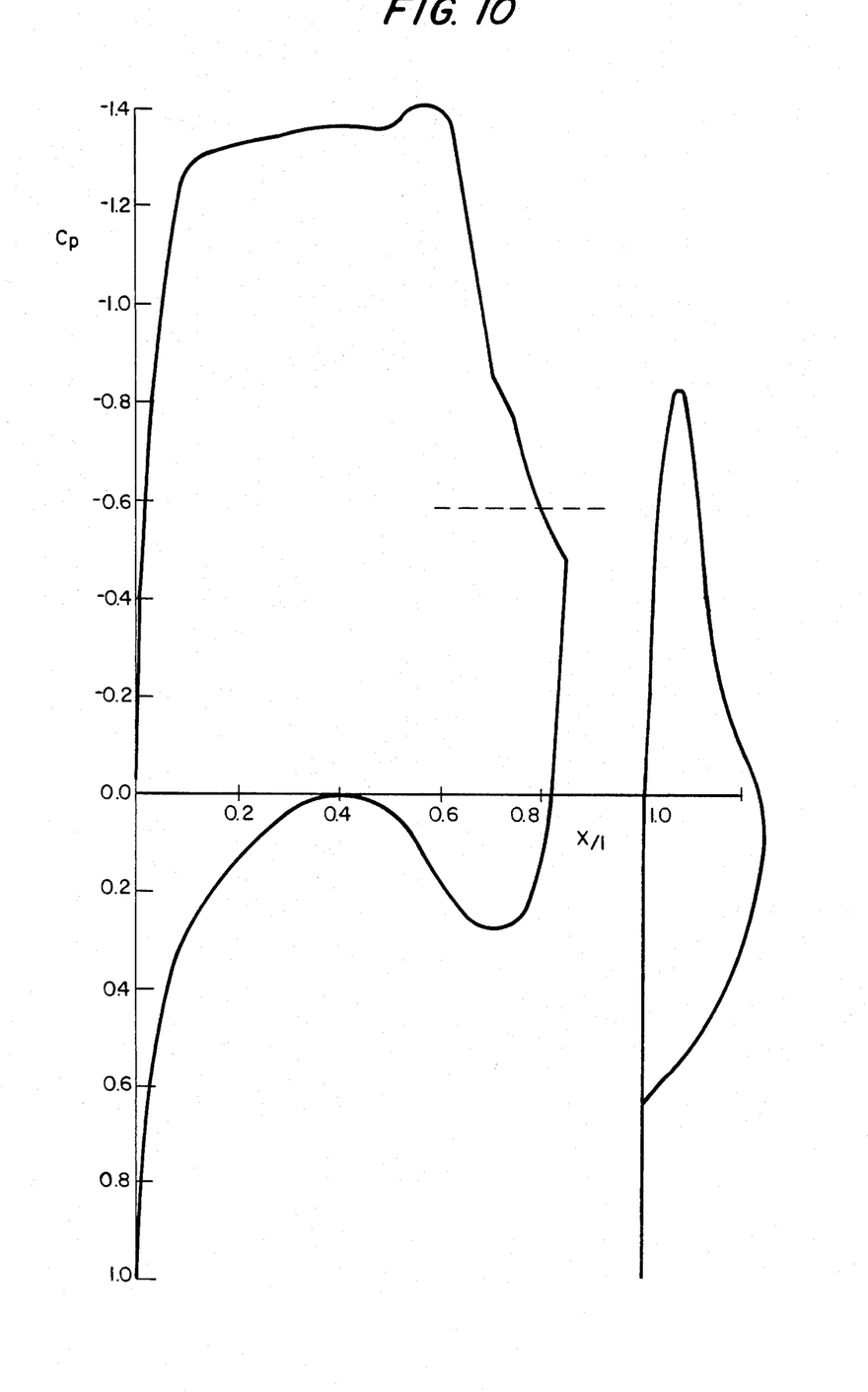
FIG. 10 shows the pressure distribution when providing a flow gap at the buffeting limit of FIG. 1b.

Accordingly, FIG. 10 shows a pressure distribution in the high-speed range corresponding to the flow diagram of FIG. 1b. A lift coefficient of more than 1.3 is still obtained at a Mach number of 0.75. As shown in FIG. 1b, the gap then is located behind the recompression area with the shock and the flow at the flap top side still makes extensive contact. The maximum achievable lift coefficient in the high speed range is about 1.5.

Such a gap or flap system also is advantageous in the low-speed range. It permits obtaining a maximum lift coefficient of about 2.5.

In summary, the design requirements for the ranges A and B are mutually contradictory because a fully symmetrical wing section would be optimal for the range A, while a markedly cambered section would be optimal for the range B. Where a wing section is expected to apply to both ranges, the particular section obviously cannot be entirely optimal in performance.

The contour features which have been described above however make it possible, as shown by FIG. 1, to create a bilaterally acting supercritical lift-wing section of the second generation which closely approaches both the optimal conventional and the optimal supercritical wing section, whereby the shock intensity and also the shock migration become small within the ranges of angle of attack and of the Mach number of interest both at the top and at the bottom sides of the section. Because the nose-heavy pitching moment is reduced by the stated features by about 30 percent, the departure from the optimal, supercritical wing section is still less, as these would have to incur a larger trimming loss. The stated contour also is advantageous for the low-speed behavior.

The selectively adjustable gap system implements the described, significant improvement at the buffeting limit.

It will be obvious to those skilled in the art that many modifications may be made within the scope of the present invention without departing from the spirit thereof, and the invention includes all such modifications.

What is claimed is:

1. Wing sections, in particular lift-wing sections for aircraft, with means for gap formation, based on a design Mach number between 0.2 and 0.9 and with a usable lift coefficient between −0.1 and 1.5 in the high-speed range and with a lift coefficient up to 2.5 in the low-speed range, in which
   (a) the curvature changes only slightly at the top and bottom sides of the lift-wing section in that contour area where supersonic flow may occur;
   the curvature of the bottom side of the wing section varies from −0.5 to −0.6 in the range of the wing depth from 12.5 to 34 percent, the first maximum of curvature of the bottom side of the section is −0.6 and is located at 34 percent of the section depth;
   the curvature of the top side of the section varies from −0.2 to −0.4 in the range of wing depth from 26 to 53 percent, the maximum of curvature of the top side of
   the section is −0.6 and is located at 57 percent of teh wing depth;
   (b) there being a region of recompression with a pronounced maximum of curvature in each both at the top and bottom sides of the wing section and comprising in each case two closely following inflection points therebehind, in which the first inflection point both at the top and the bottom side of the section is located at a spacing of 2 to 5 percent of the section depth behind the first maximum of curvature, the second maximum of curvature is located at a spacing of 10 to 16 percent of the section depth behind the first maximum of curvature both on the top and the bottom sides of the section; and
   (c) a flow gap being selectively set in such a manner that the gap is located behind the recompression region of the top side of the wing section.

2. Lift-wing section according to claim 1 in which an intersection of the curvatures of the top and bottom sides of the section takes place at 22 percent of the section depth, and the curvature of the top side of the section is more pronounced than that of the bottom side.

3. Lift-wing section according to claim 1 in which the second maximum of curvature of the bottom side of the section is 1.05 and is located at 87 percent of the section depth.

4. Lift-wing section according to claim 1 in which, selectively in relation to the gap formation, use is made of a gap flap moved into a specific operational position by translation and/or rotation both in the high-speed and the low-speed ranges.

5. The method of operating a wing for aircraft having means for gap formation located behind a recompression region of the top side of the wing section and being based on a design Mach number between 0.2 and 0.9 and with a usable lift coefficient between −0.1 and 1.5 in the high-speed range and with a lift coefficient up to 2.5 in the low-speed range, and in which the curvature changes only slightly at the top and bottom sides of the lift-wing section in that contour area where supersonic flow may occur, this area is followed in each case by a region of recompression with a pronounced maximum of curvature in each both at the top and bottom sides of the wing section and comprising in each case two closely following inflection points therebehind, comprising the step of
selectively setting and opening the gap during high speed flight.

* * * * *